United States Patent [19]

Stocker

[11] Patent Number: 4,869,123

[45] Date of Patent: Sep. 26, 1989

[54] CABLE LENGTH SELF-LOCKING ADJUSTMENT DEVICE

[75] Inventor: Raymond Stocker, West Bloomfield, Mich.

[73] Assignee: Ford Motor Company, Dearborn, Mich.

[21] Appl. No.: 799,363

[22] Filed: Nov. 18, 1985

[51] Int. Cl.[4] .............................................. F16C 1/10
[52] U.S. Cl. .................................. 74/501.5 R; 74/502; 74/503
[58] Field of Search ........ 74/500.5, 501.5 R, 501.5 H, 74/501.6, 502, 502.1, 502.2, 502.3, 502.4, 502.5, 502.6

[56] References Cited

U.S. PATENT DOCUMENTS

| | | | |
|---|---|---|---|
| 816,702 | 4/1906 | Bell . | |
| 972,585 | 10/1910 | Vogel . | |
| 1,129,153 | 2/1915 | Winter . | |
| 1,927,615 | 12/1932 | Ponti et al. | 74/39 |
| 2,378,655 | 6/1945 | Popp | 74/502.6 |
| 2,434,358 | 8/1943 | Frank | 174/84 |
| 2,751,054 | 9/1954 | Del Re, Sr. | 192/4 |
| 3,150,539 | 9/1964 | Wallis, Jr. | 74/501 |
| 3,206,249 | 2/1963 | Gateley | 297/416 |
| 3,348,427 | 4/1965 | Wilkey | 74/502 |
| 3,546,962 | 12/1970 | Ruhala | 74/501 |
| 3,572,159 | 6/1969 | Tschanz | 74/501 |
| 3,587,341 | 6/1971 | Fiddler | 74/501 |
| 3,710,645 | 1/1973 | Bennett | 74/501.5 R |
| 3,732,748 | 5/1973 | Cavalli | 74/502 |
| 3,988,943 | 11/1976 | Orcutt | 74/501.5 R |
| 4,154,124 | 5/1979 | Hungerford et al. | 74/502.1 |
| 4,177,631 | 12/1979 | Fillmore | 74/501.5 R |
| 4,378,713 | 4/1983 | Haskell et al. | 74/501.5 R |
| 4,448,090 | 5/1984 | Carre et al. | 74/501.5 R |
| 4,464,350 | 8/1984 | Deligny | 74/501.5 R |

FOREIGN PATENT DOCUMENTS

| | | | |
|---|---|---|---|
| 0120616 | 10/1984 | European Pat. Off. | 74/501.5 R |
| 3305417 | 6/1984 | Fed. Rep. of Germany | 74/501.5 R |
| 0080959 | 5/1982 | Japan | 74/501.5 R |
| 8401196 | 3/1984 | PCT Int'l Appl. | 74/501.5 R |
| 2088502 | 6/1982 | United Kingdom | 74/501.5 R |
| 2157789 | 10/1985 | United Kingdom | 74/501.5 R |

Primary Examiner—Vinh Luong
Attorney, Agent, or Firm—Frank G. McKenzie; Donald J. Harrington

[57] ABSTRACT

In a cable length adjuster, a slider is guided for movement within a housing and is biased by a spring to take up unnecessary slack in the cable. A latch is moveable, normal to the direction of slider movement, and becomes engaged with teeth on the slider. A stud carried on the housing fixes the position of the housing against movement in the direction the slider moves. A leaf spring forces the latch toward locking engagement with the slider.

5 Claims, 2 Drawing Sheets

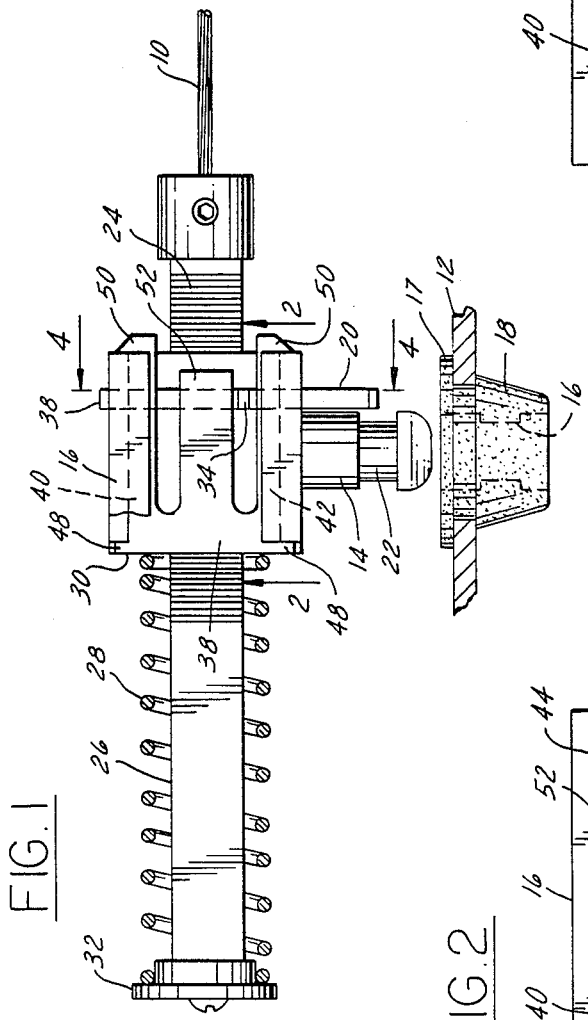
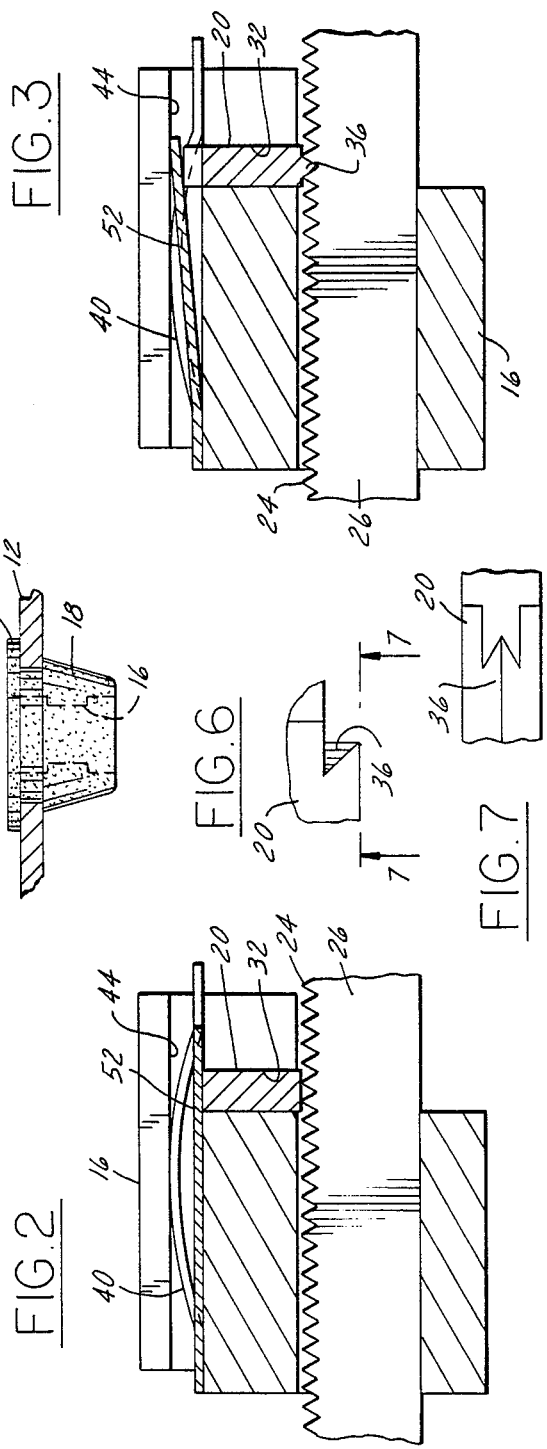

CABLE LENGTH SELF-LOCKING ADJUSTMENT DEVICE

BACKGROUND OF THE INVENTION

1. Field of the Invention

This invention relates to a device for transmitting motion between two components by a cable. More particularly, this invention pertains to a device for automatically adjusting the correct length of the cable assembly that connects the components.

2. Description of the Prior Art

Most cable assemblies that transmit motion from one moveable component to another include means adjacent each end of a conduit for attaching the cable to a support structure and a core element, usually a cable, extending from each end of the conduit. Frequently, however, the end of the cable adjacent one of the components to be moved does not extend from the conduit beyond a fixed mounting point the proper distance for attachment to the component. It is desirable to adjust the effective length of the assembly by changing the position of one end of the cable after the assembly is installed by changing the length of the path over which the conduit extends. Usually this path has curves or bends whose lengths are reduced by increasing the length of the conduit that extends beyond the mounting point.

However, once the assembly is adjusted, it is usually difficult to release the locking member from engagement on ratchet teeth formed on a fitting that is secured to the conduit to reposition or readjust the assembly for maintenance or repair. U.S. Pat. No. 3,572,159 describes a motion transmitting remote control assembly having this disadvantage.

Other disadvantages of the prior art cable assemblies is that the amount of force with which the ratchet teeth are urged together is not easily controlled. Furthermore, it is difficult to vary the force among identical configurations having different requirements.

A cable assembly for transmitting motion from one component to another requires that one end of the cable be attached to the first component at a predetermined position and that the second component be positioned correctly in relation to the position of the first component. The length of the cable that connects the components in the predetermined position should be set correctly within a fairly close tolerance so that the motion of one of the components is transmitted accurately by the cable to the second component. One feature of this method of assembly is that in the process of attaching the end of the cable assembly to the second component, a locking or latching member is moved to a locking position to set the correct length of the cable assembly concurrently with the making of the attachment to the second component.

SUMMARY OF THE INVENTION

The cable length adjusting device according to the present invention for coordinating the movement of components connected by the device includes a core wire adapted to be connected to a slider element having multiple engageable teeth that extend over a portion of the distance that separates the first and second components. A housing provides a hole through which the slider moves relative to a fixed attachment point along the axis of the cable. The housing can be connected to a mounting bracket or similar component that fixes its position against displacement toward either of the components connected by the cable assembly. A latch carried on the housing is moveable from a position of disengagement with the teeth of the slider to a position of locking engagement with the slider. A leaf spring carried on the housing supplies a force to the latch when in the locking position, which maintain spring assists the housing to the latch engaged with the teeth of the slider. In the unlocked position, the latch moves from engagement with the leaf spring. A compression spring fitted between the housing and the slider continuously applies a biasing force to the cable tending to move the cable and slider through the housing and away from one of the components connected by the cable assembly. Alternatively, a tension spring located on the opposite side of the housing from the location of the compression spring connects the housing and the slider. This spring applies to the slider and cable a force that continuously biases the cable away from one of the connected components. The tension spring or the compression spring takes up slack in the cable and eliminates the need for the operator to apply by hand a force to the cable assembly for this purpose.

This cable length adjuster, is adapted to be connected to the throttle lever of a carburetor by inserting a stud formed integrally with the housing into a hole in a grommet carried on the throttle lever mechanism of the carburetor. The latch, located on the housing adjacent the stud, is moved within a slot from the unlocked position to the locked position as the stud is inserted into the grommet. When the operator forces the stud into the grommet, the latch is forced, due to contact with the grommet, from the unlocked position to the locked position where it engages the slider teeth and fixes the slider to the housing. The housing is fixed in position against displacement by its attachment to the throttle lever mechanism of the carburetor. When this occurs, the correct length of the cable assembly is set automatically because its first end will have been connected to the throttle valve lever mechanism at the transmission, which is held in a predetermined position, preferably the wide open throttle position, and its housing is connected to the carburetor, whose throttle valve is held at the corresponding position when the housing connection is made to it.

BRIEF DESCRIPTION OF THE DRAWINGS

FIG. 1 is a top view of the cable length adjuster according to this invention.

FIG. 2 is a partial side view in the direction 2—2 of the adjuster. of FIG. 1.

FIG. 3 is a partial side view in the direction 2—2 of the adjuster of FIG. 1 showing the cam moved into the self-locking position.

FIG. 5 is a cross section taken at the plane 4—4 of FIG. 1 showing the cam in the locked position.

FIG. 6 shows the details of the latch tooth that engages the slider.

FIG. 7 is a bottom view of the latch tooth that engages the slots on the upper surface of the slider.

DESCRIPTION OF THE PREFERRED EMBODIMENT

Figure 4:
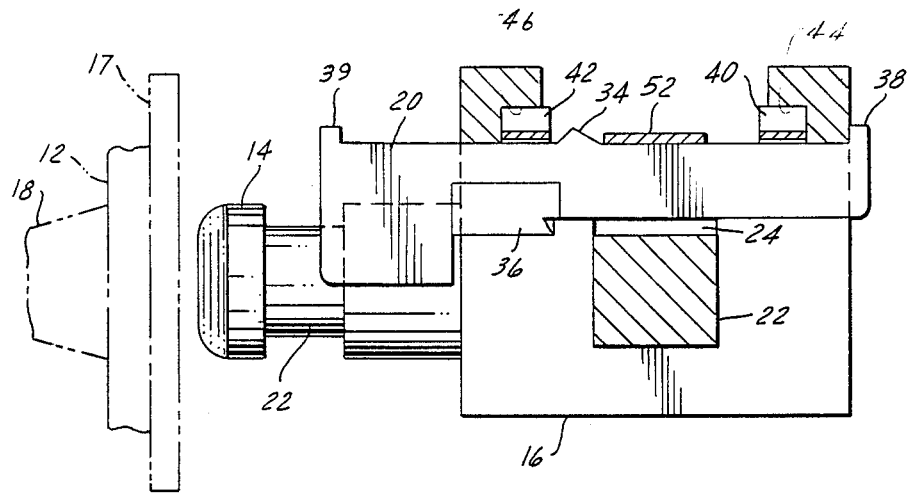
FIG. 4 is a cross section taken at plane 4—4 of FIG. 1.

The cable length adjuster according to this invention is supported near one end on the throttle lever mechanism 12 of a carburetor. A stud 14 connected integrally with housing 16 is inserted into the hole of the grommet 18 mounted on the throttle lever mechanism. At the opposite end of the cable, at a substantial distance from the carburetor, the cable is connected to the throttle valve linkage of an automatic transmission.

A locking member 20 carried on the housing is fitted within a transversely directed slot so that it can move laterally with respect to the axis of the cable. The latch 20 is located on the housing adjacent stud 14 so that it contacts the flange of grommet 18 when the stud is inserted within the hole of the grommet. When the recess 22 is forced through the grommet into alignment with the mounting plane, locking member 20 is forced from the position of FIG. 1 across the axis of the cable to a position of locking engagement with the teeth 24 of a slider 26.

The compression spring 28 bears on the end face 30 of housing 16 and applies a force to a stop 32 fixed to the adjacent end of the slider. Cable 10 is connected mechanically to the opposite end of the slider; therefore, spring 28 applies a force that biases the slider and cable away from the transmission and toward the carburetor to remove slack in cable 10 and provide a precise adjustment. Engagement of latch 20 with slider teeth 24 connects the slider to the housing. Tang 34 prevents premature engagement of latch 20 before installation of the cable assembly to the throttle lever.

Slider 26 is rectangular in cross section and has on its upper surface, along a portion of its length, multiple transversely directed slots 24 that are engageable by locking member 20 as it moves from the unlocked position of FIGS. 2 and 4 to the locked position of FIGS. 3 and 5. In FIG. 4, housing 16 is shown to have a rectangular hole into which the slider 26 moves axially. Latch 20, guided within the transversely directed slot, includes a tang 34 on its upper surface, a transversely directed tooth on its lower surface, which is engageable with the teeth on the slider, and stops 38, 39, which limit transverse movement of the latch by contact with the side walls of housing 16.

A leaf spring 37 carried on the upper surface of the housing has three legs extending parallel to the axis of the slider. The outer legs 40, 42 are fitted respectively within axially directed slots 44, 46 on the upper surface of the housing and retain the leaf spring in its position on the housing by tangs 48, 50 which engage opposite axial ends of the upper surface of the housing. The outer legs are arcuate, as shown in FIGS. 2 and 3, and develop through contact with the lower surface of the recesses 44, 46 a downwardly directed force, which holds the leaf spring in contact with the lower edge of the recesses. Located laterally between the end fingers of the leaf spring is a center finger 52 directed parallel to the axis of the slider end located above latch 20. Finger 52 is held resiliently downward slightly above the upper surface of the latch and is contacted by tang 34 when it moves from the unlocked position of FIG. 4 to the locked position of FIG. 5. When the latch is moved to the locked position, finger 52 forces tooth 36 on the lower surface of latch 20 downward. Contact between the latch and the housing holds the latch engaged with slider 26, whose consecutive teeth 24 are engaged with tooth 36 on the lower surface of the latch.

In operation, the throttle valve linkage of the automatic transmission is located either at the wide open throttle position or the closed throttle position and the cable length adjuster assembly is connected to the throttle valve mechanism. Before the adjuster is connected, when it has the position corresponding to the position of the throttle valve linkage, the throttle plate of the carburetor is set at the position that corresponds to the position of the throttle valve linkage on the transmission. Then the adjuster stud 14 is forced into grommet 18 on the carburetor throttle valve mechanism. When this occurs, latch 20 is moved into locking engagement with the slider and the length of the cable is correctly set. The leaf spring assists holding the latch in the locked position between adjacent notches on the upper surface of the slider. The throttle valve linkage is part of a control used to regulate the hydraulic pressure of the transmission to control the automatic shift and timing between the shifts with reference to the position of the carburetor throttle plate.

Before the stud is inserted into the grommet, housing 16 is free to move relative to the slider. This movement permits location of the housing at the correct position on the slider before the initial insertion of the stud into the grommet. As the stud is inserted further within the grommet, latch 20 is moved from the position shown in FIGS. 2 and 4, where tang 34 is out of contact with leaf spring 52, to the position of FIGS. 3 and 5, where tang 34 is forced downwardly by contact with leaf spring finger 52 bringing the lower tooth 36 of the latch into engagement between adjacent successive teeth on the upper surface of slider 26. The compression spring 28 applies a tension force to the cable assembly and thereby removes unnecessary slack in the cable assembly.

Figure 8:
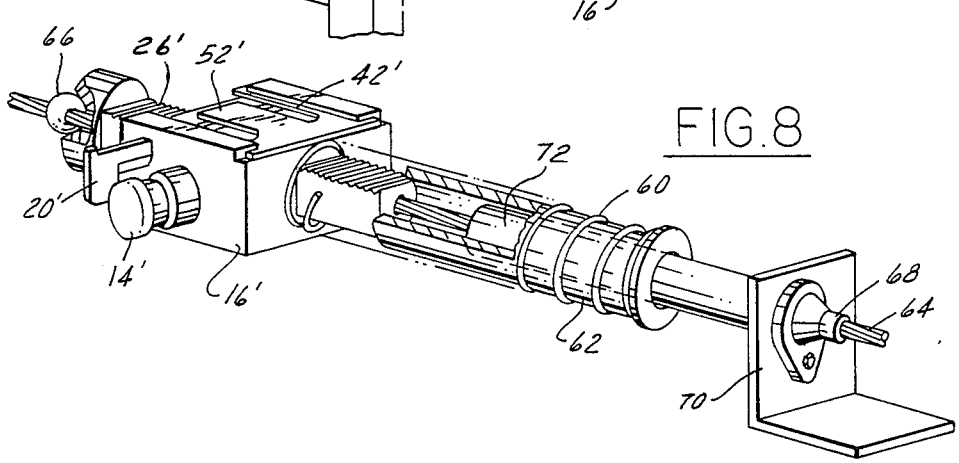
FIG. 8 is an isometric view of an alternate configuration of the cable length adjuster.

In the cable length adjusting device of FIG. 8, a tension spring 60 is substituted for the compression spring 28. Spring 60 has one end connected to the housing 16' and its opposite end connected to a tubular extension 62 formed integrally with the slider 26'. The cable 64 extends entirely through a bore on a central axis of the slider and is connected to the slider by a staked ball 66 at the far end of the slider 26'. In the assembly of FIG. 8, latch 20' is located at the opposite axial side of stud 14 from its position shown in the assembly of FIG. 1. In some installations, this may be a more convenient position for the latch. Also, the central finger 52' of the leaf spring is directed toward the end of the slider and away from the transmission, whereas in the assembly of FIG. 1, the central finger is directed toward the transmission assembly. FIG. 8 shows the core wire 64 located in a conduit 72 that extends between the transmission throttle valve linkage and the cable length adjuster. The conduit may terminate near a mounting bracket 70 to protect the core wire from damage.

Tension spring 60 applies a biasing force to the core wire and slider and performs the same function as that of spring 28 in the design shown in FIG. 1. In some installations, it is preferred that the biasing spring be located on the interior side of the housing, where the tension spring is located, rather than on the exterior side of the housing, where the compression spring is located. In either case, the slider and core wire are urged by the spring away from the attachment at the transmission.

Having described a preferred embodiment of my invention, what I claim and desire to secure by U.S. Letters Patent is:

1. A length adjuster for adjusting and setting the length of a connecting device that transmits motion between the members that it connects comprising:

housing means adapted for mounting fixed against longitudinal displacement;

mounting means for connecting the housing means to a support that prevents displacement of the housing means relative to the support;

slider means connectable to the connecting device, moveable in both longitudinal directions relative to said housing means having engageable means thereon;

latching means slidably mounted on said housing means for alternate engagement with and disengagement from said engageable means, adapted to contact the mounting means as the housing means is connected to said support, whereby the latching means fixes the slider means to said housing means.

2. The adjuster of claim 1 further comprising spring means for urging movement of the slider means relative to the housing means.

3. The adjuster of claim 1 further comprising spring means for urging the latching means to connect the housing means and the slider means.

4. The adjuster of claim 1 further comprising:

first spring means for urging movement of the slider means relative to the housing means; and second spring means for preventing unintentional movement of the latching means.

5. The adjuster of claim 1 wherein said housing means includes means for guiding movement of the latching means between an engaged position, where the housing means is fixed to the slider means, and a disengaged position; and the latching means is located with respect to the mounting means so that in the process of connecting the housing means to the support the latching means moves to the engaged position.

* * * * *